Sheet 1 - 2 Sheets.

G. E. King.
Fluting Mach.

No. 3000. Reissued Jun. 23. 1868.

Witnesses.

A. Le Clerc
Geo. Reed

Inventor.

Geo Erwin King

Sheet 2. 2 Sheets.

G. E. King.

Fluting Mach.

No. 3000. Reissued Jun. 23. 1868.

Witnesses.
A. Leclerc
Geo. Reed

Inventor.
Geo. E. King

UNITED STATES PATENT OFFICE.

GEORGE EDWIN KING, OF NEW YORK, N. Y.

IMPROVEMENT IN FLUTING-MACHINES.

Specification forming part of Letters Patent No. 62,492, dated February 26, 1867; reissue No. 3,000, dated June 23, 1868.

DIVISION A.

*To all whom it may concern:*

Be it known that I, GEORGE EDWIN KING, of the city, county, and State of New York, have invented certain new and useful Improvements in Fluting-Machines; and I do hereby declare that the following is a full, clear, and exact description of the same, reference being had to the accompanying drawings, making a part of this specification, in which—

Figure 1:
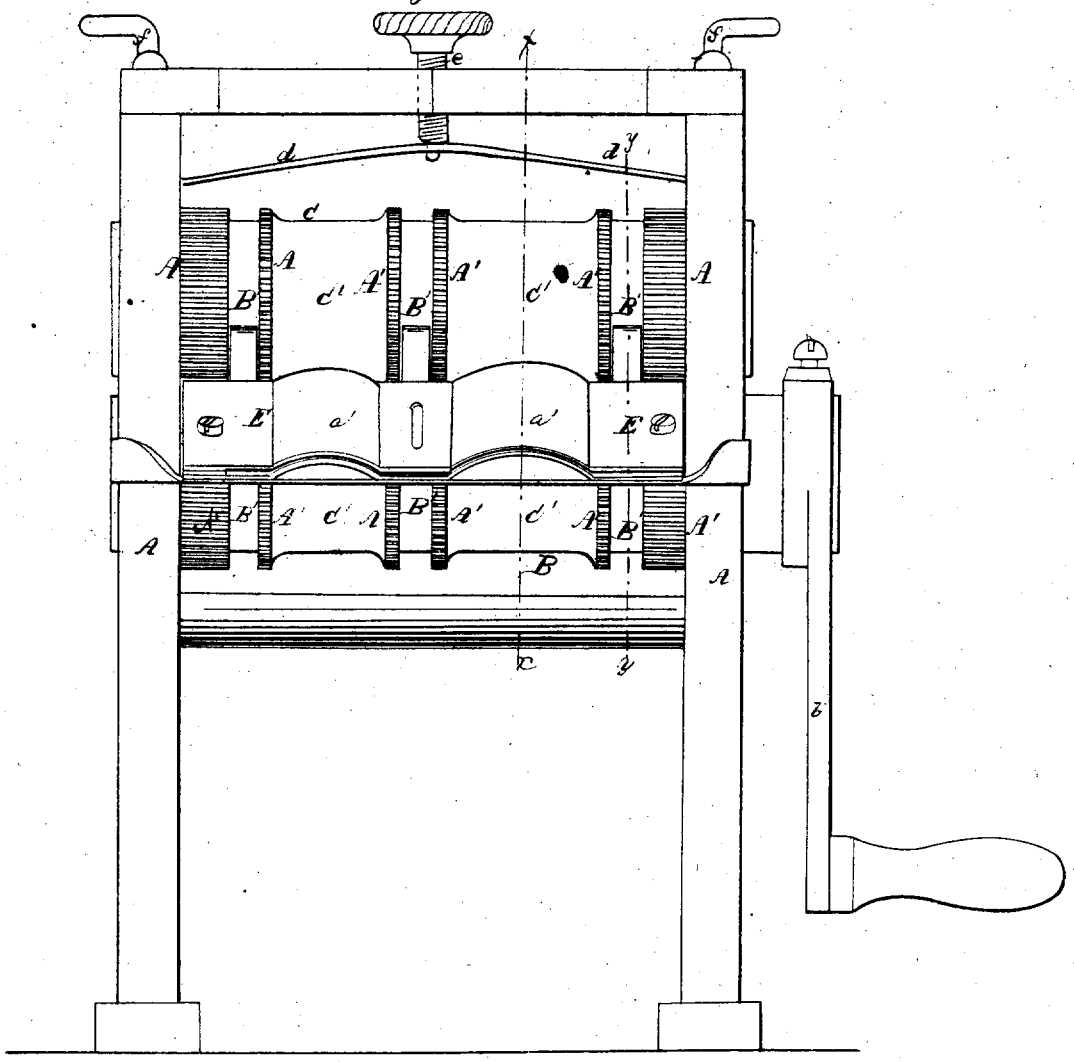
Figure 2:
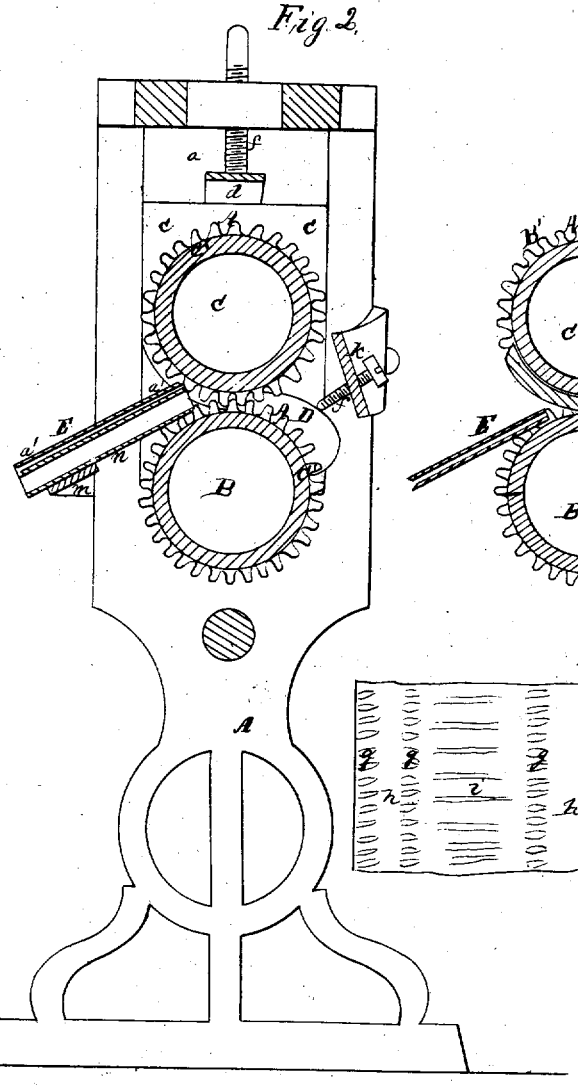
Figure 3:
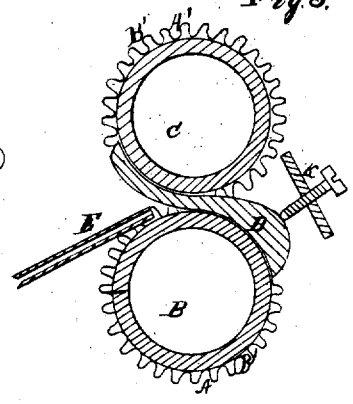
Figure 4:
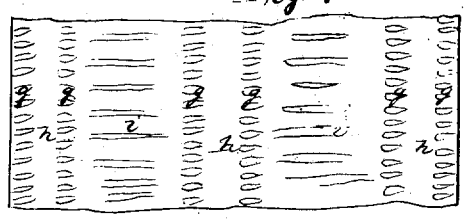

Figure 1 is a front elevation of a fluting-machine constructed according to my invention. Fig. 2 is an end elevation of the same. Fig. 3 is a detached section representing a portion of the same. Fig. 4 is a plan view of a piece of the fluted puffing, for the manufacture of which my invention is intended.

Similar letters of reference indicate corresponding parts in all the figures.

This invention is designed for making puffing applicable to shirt-bosoms, trimming, or other purposes of dress, in which the article, as it issues from the machine, is (without having recourse to laundering) delivered in a complete form, either single or in two or more series or rows, composed of flattened borders, with flutes running along their inner edges, and puffed or crinkled surfaces between the flutes.

The invention consists in a guide constructed with one or more curved or arched portions, in combination with one or more suitable fluting-rollers, whereby the material, in passing through the machine, is fluted and contracted laterally, as it were, or drawn up between the flutes, to produce the required crinkled surface or surfaces in the puffing.

To enable others to understand the construction and operation of my invention, I will proceed to describe it with reference to the drawings.

A represents the frame which supports the working parts of the apparatus, and situated longitudinally in the upper part of which are two fluting-rollers, B and C, which are situated one above the other, with their ends projecting through the large vertical slots, *a*, formed in the ends of the frame A; the roller B being supported in semicircular bearings formed in the lower ends of the slots *a*, and furnished at one end with a crank, *b*, and the upper roller, C, working in semicircular bearings *c*, formed in sliding blocks *c*, placed upon the ends thereof, and pressed down upon the same by a spring, *d*, the tension of which may be regulated by means of a vertical screw, *e*, situated centrally in the top of the frame A. When desired, the upper roller, C, may be held within a given distance of the lower roller by vertical set-screws *f*, situated, one at each end of the top of the aforesaid frame A, and acting upon the sliding or adjustable bearings *c*. The puffing is represented in Fig. 4, and is formed of strips of any suitable fabric, and of a width, when finished, nearly or quite equal to the length of the fluting-rollers B C, and is formed with longitudinal portions *g*, which are fluted transversely to the length of the strip aforesaid; also with portions *h*, in which the fabric is pressed flat, and through which longitudinal rows of stitching are formed, to render permanent the conformation of the puffing; and also with portions *l*, which are intended to be wider than the parts just described, and which are puffed or crinkled in such manner as to possess an irregular wavy surface. In order to form these several portions of the puffing, each of the fluting-rollers B C is formed with as many annular or circumferential series, A′, of grooves and flutes as there are fluted portions *g* upon the puffing, with as many narrow annular faces, B′, as there are flattened portions *h*, and with as many comparatively broad portions, C′, as there are puffed portions *i* in the finished puffing, each of the said parts of the rollers being of the same width as that portion of the completed puffing which it is designed to shape, and the circumferential faces or portions C′ being of such diameter that, when the two rollers are in proper position, those upon one roller will be situated at such distance from those upon the other that no considerable pressure will be exerted upon the fabric in passing between them, and the several series A′ of grooves and flutes upon one roller gearing into those upon the other roller. D indicates pressers, the rearmost end of each one of which is curved downward, and fitted upon the upper rearmost part of each of the faces B′ of the lower roller B, with its forward end curved upward in contact with the forward sides of the corresponding face B′ upon the other roller, as shown in Figs. 2 and 3, the aforesaid rearmost ends of these pressers D being pressed against the roller B by set-screws *j*, passing through a horizontal bar or brace, *k*, secured upon the rear of the frame A. Fixed upon the forward side of the frame A, in front of the roller B, is a horizontal supporting-brace, *m*, which has fixed upon it an inclined plate, *n*, upon which is supported the inclined guide E, which is composed of two pieces of sheet metal, secured one over the other, at such a distance apart as to permit the passage of the cloth or fabric between them; and those parts of this guide E in front of the plain cylindrical portions C′ of the rollers are curved upward or arched transversely, as shown at *a*′, in such manner that the width of the fabric passed between each pair of the plain portions C′ will be greater, if stretched out to its full extent, than the width of the said portions, so that the said fabric, by means of its increased width, will be crinkled or puffed in passing between the aforesaid portions C′, as will be presently fully set forth.

The end of the strip of cloth or fabric from which the fluted puffing is to be formed is passed into and through the guide E, and between the rollers B C, and a rotary motion in the direction of the arrow shown in Fig. 2 is communicated to the said rollers by turning the crank *b*, or by other suitable means. The fabric is drawn lengthwise between the rollers, those portions thereof which pass between the several opposite series A′ of grooves and flutes of the two rollers being fluted, as shown at *g* in Fig. 4, while those portions of the said fabric which pass between the smooth narrow annular faces B′ of the rollers, being formed into gathers by the fluting of the fabric at the sides or edges thereof, are pressed flat by passing under the pressers D, as the fabric is drawn along, at the same time that those portions of the fabric drawn through the curved or arched parts *a*′ of the guide E, being, if stretched to their full extent, of a width greater than that of the smooth cylindrical portions C′, and, being also gathered by the fluting formed at their sides or edges, are caused to assume a crinkled or puffed form as they are passed between the aforesaid portions C′, the distance between the opposite smooth portions C′ aforesaid being such that no pressure is exerted upon the fabric passing between them beyond that required to simply press the convex surfaces thereof downward to a sufficient degree to insure the shaping thereof into the puffed condition just herein described. The extent to which the material will be thus contracted laterally, as it were, or drawn up between the flutes, will be governed by the excess in length of the arched portions *a*′ of the guide over a straight line or lines connecting such arched portions at their base.

By these means the fluted puffing is brought into the form required in the finished article without the necessity of washing the same in order to bring the puffing into such form.

To complete the puffing, longitudinal rows of stitching are formed in the flat parts *h* of the puffing, to retain it in shape, and, when desired, the puffing as thus completed may be divided longitudinally in the said parts *h*, to separate it into narrow pieces, as required, for various trimming purposes.

What I claim as new, and desire to secure by Letters Patent, is—

The guide E, constructed with one or more curved or arched portions, *a*′, in combination with suitable fluting-rollers, substantially as herein set forth, for the purpose specified.

GEO. E. KING.

Witnesses:
A. LE CLERC,
E. P. TRACY.